United States Patent
Wostyn et al.

(10) Patent No.: US 9,565,016 B2
(45) Date of Patent: Feb. 7, 2017

(54) PROTECTION OF THE EXECUTION OF AN ALGORITHM AGAINST SIDE-CHANNEL ATTACKS

(71) Applicant: Proton World International N.V., Zaventem (BE)

(72) Inventors: Alexandre Wostyn, Brussels (BE); Jean-Louis Modave, Ottignies (BE)

(73) Assignee: Proton World International N.V., Diegem (BE)

( * ) Notice: Subject to any disclaimer, the term of this patent is extended or adjusted under 35 U.S.C. 154(b) by 134 days.

(21) Appl. No.: 14/521,150

(22) Filed: Oct. 22, 2014

(65) Prior Publication Data

US 2015/0110265 A1    Apr. 23, 2015

(30) Foreign Application Priority Data

Oct. 23, 2013 (FR) .................................... 13 60300

(51) Int. Cl.
| | |
|---|---|
| *H04K 1/00* | (2006.01) |
| *H04L 9/00* | (2006.01) |
| *G06F 12/14* | (2006.01) |
| *G06F 21/55* | (2013.01) |
| *G06F 21/72* | (2013.01) |
| *G06F 21/77* | (2013.01) |

(52) U.S. Cl.
CPC ........... *H04L 9/003* (2013.01); *G06F 12/1408* (2013.01); *G06F 21/558* (2013.01); *G06F 21/72* (2013.01); *G06F 21/77* (2013.01); *H04L 2209/26* (2013.01)

(58) Field of Classification Search
CPC ......... H04L 9/0612; H04L 9/003; H04L 9/004
USPC ..... 380/28, 270, 260; 713/190–192; 726/34; 326/4
See application file for complete search history.

(56) References Cited

U.S. PATENT DOCUMENTS

| | | | | |
|---|---|---|---|---|
| 4,797,928 A | * | 1/1989 | Dykes | G06F 21/72 713/192 |
| 6,046,680 A | * | 4/2000 | Soenen | G07C 9/00309 340/5.23 |
| 7,293,158 B2 | * | 11/2007 | Calvignac | H04L 49/901 711/155 |
| 7,681,050 B2 | * | 3/2010 | Blom | G06F 21/64 713/161 |
| 7,697,687 B2 | * | 4/2010 | Liang | H04L 9/12 380/255 |
| 7,702,058 B2 | * | 4/2010 | Margules | H03L 7/06 375/327 |
| 7,945,792 B2 | * | 5/2011 | Cherpantier | G06F 21/86 365/145 |

(Continued)

FOREIGN PATENT DOCUMENTS

| | | |
|---|---|---|
| FR | 2 776 410 A1 | 9/1999 |
| WO | 2008/084016 A1 | 7/2008 |

OTHER PUBLICATIONS

French Search Report dated Apr. 7, 2014, for French Application No. 1360300, 7 pages.

*Primary Examiner* — Dede Zecher
*Assistant Examiner* — Viral Lakhia
(74) *Attorney, Agent, or Firm* — Seed IP Law Group LLP

(57) ABSTRACT

A protection mechanism for the execution of an encryption algorithm is disclosed. In the mechanism the encryption algorithm has its execution preceded by an update of a counter stored in a reprogrammable non-volatile memory. Storing the value of the counter into the memory corresponds with the execution of the algorithm.

18 Claims, 2 Drawing Sheets

(56) References Cited

U.S. PATENT DOCUMENTS

| | | | | |
|---|---|---|---|---|
| 8,386,800 B2* | 2/2013 | Kocher | G06F 21/602 |
| | | | 380/277 |
| 8,645,716 B1* | 2/2014 | Dujari | G06F 12/1433 |
| | | | 380/277 |
| 8,750,502 B2* | 6/2014 | Kirkpatrick | H04L 9/0866 |
| | | | 380/44 |
| 8,842,829 B2* | 9/2014 | Bresson | E05F 15/60 |
| | | | 380/258 |
| 8,971,526 B2* | 3/2015 | Coron | H04L 9/003 |
| | | | 380/28 |
| 9,122,964 B2* | 9/2015 | Krawczewicz | G06K 19/0701 |
| 9,177,153 B1* | 11/2015 | Perrig | G06F 21/577 |
| 2002/0178371 A1* | 11/2002 | Kaminaga | G06F 7/723 |
| | | | 713/189 |
| 2007/0050642 A1* | 3/2007 | Flynn | G06F 12/1408 |
| | | | 713/192 |
| 2009/0113217 A1* | 4/2009 | Dolgunov | G06F 21/556 |
| | | | 713/190 |
| 2010/0208894 A1* | 8/2010 | True | B60R 25/24 |
| | | | 380/270 |
| 2011/0138192 A1* | 6/2011 | Kocher | G06F 21/602 |
| | | | 713/189 |
| 2011/0285421 A1* | 11/2011 | Deas | H04L 7/0337 |
| | | | 326/8 |
| 2013/0019324 A1* | 1/2013 | Tehranipoor | H03K 3/0315 |
| | | | 726/34 |
| 2013/0117577 A1* | 5/2013 | Hars | G06F 12/1408 |
| | | | 713/190 |
| 2014/0173294 A1* | 6/2014 | Buer | G06F 21/78 |
| | | | 713/193 |
| 2014/0301546 A1* | 10/2014 | Chevallier-Mames | H04L 9/0631 |
| | | | 380/28 |

* cited by examiner

PROTECTION OF THE EXECUTION OF AN ALGORITHM AGAINST SIDE-CHANNEL ATTACKS

CROSS-REFERENCE(S) TO RELATED APPLICATION(S)

This application claims the priority benefit of French Patent application number 13/60300, filed on Oct. 23, 2013, the content of which is hereby incorporated by reference in its entirety to the maximum extent allowable by law.

BACKGROUND

Technical Field

The present disclosure generally relates to electronic circuits and, more specifically, to circuits executing encryption algorithms and using a storage in a non-volatile memory.

Discussion of the Related Art

In most applications using encryption algorithms, a protection against fault injection attacks using a counter is implemented. The counter is updated on each execution of the algorithm to make sure that an attacker is not performing multiple executions of the algorithm to discover its secret data (typically, the keys). The updating of the counter (incrementation or decrementation) and the storage of its new value in a non-volatile memory (typically an EEPROM) are performed before the algorithm is executed to avoid for an attacker to interrupt the process at the end of the algorithm and before the counter update, which would made the protection inefficient.

Current protections are not yet optimal and may be improved.

BRIEF SUMMARY

An embodiment overcomes all or part of the disadvantages of usual solutions of protection of the execution of an encryption algorithm.

Another embodiment provides a method particularly adapted to an AES algorithm.

Another embodiment aims at making it more difficult to detect phases of writing into the non-volatile memory and of execution of the algorithm, especially by analysis of the power consumption of the circuit executing such functions.

Thus, an embodiment provides a method of protecting the execution of an encryption algorithm having its execution preceded by the update of a counter intended to be stored in a reprogrammable non-volatile memory, wherein the value of the counter is stored into the memory during the execution of the algorithm.

According to an embodiment, the method comprises:
  activating the memory for a writing;
  writing the value of the counter into the memory;
  deactivating the memory write function; and
  executing the algorithm between the activation and deactivation steps.

According to an embodiment, the writing starts at the same time as the execution of the algorithm.

According to an embodiment, the writing starts after the beginning of the execution of the algorithm.

According to an embodiment, the algorithm is an AES algorithm.

An embodiment also provides an encryption algorithm execution circuit.

The foregoing and other features and advantages will be discussed in detail in the following non-limiting description of specific embodiments in connection with the accompanying drawings.

DETAILED DESCRIPTION

Figure 1:
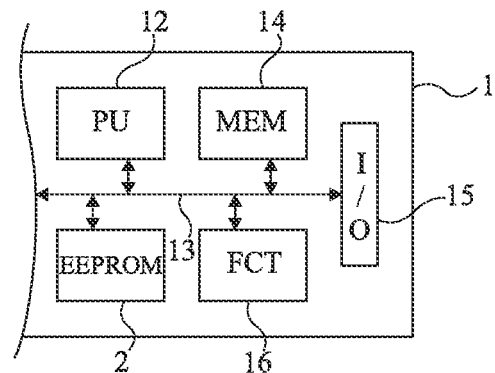
FIG. 1 is a simplified representation in the form of blocks of an example of electronic circuit of the type to which the embodiments which will be described apply.

The same elements have been designated with the same reference numerals in the different drawings. For clarity, only those steps and elements which are useful to the understanding of the embodiments which will be described have been shown and will be detailed. In particular, the steps internal to the AES algorithm, which is taken as an example, have not been detailed, the described embodiments being compatible with usual executions of an AES algorithm and its different variations. Further, the processes of reading from and writing into an EEPROM have only been detailed for the needs of the present description, the rest being compatible with usual processes. In the following description, reference will be made to an example of AES algorithm. However, the present disclosure and its variations more generally apply to any encryption algorithm for which the number of executions is desired to be counted and the value of this counter is desired to be stored in an EEPROM to protect the secret quantities used by the algorithm. Secret quantity means information which can only be accessed by authorized circuits or users.

FIG. 1 is a block diagram showing an example of electronic chi 1 of the type to which the described embodiments apply. Such a circuit comprises a processing unit 12 (PU), for example, a microprocessor, a microcontroller, a state machine in wired logic, etc. one or a plurality of volatile or non-volatile memories 14 (MEM) (i.e., non-transitory computer readable media); one or a plurality of circuits executing functions depending on the application. These different functions have been symbolized by a block 16 (FCT) in FIG. 1. The different elements of circuit 1 communicate together over one or a plurality of data, address, and control buses 13, and with other elements, not shown, and one or a plurality of circuits 15 forming input/output interfaces (I/O) with the outside.

In the circuits targeted by the described embodiments, electronic circuit 1 further comprises at least one memory 2 (EEPROM) of non-volatile electrically erasable and programmable memory type.

Figure 2:
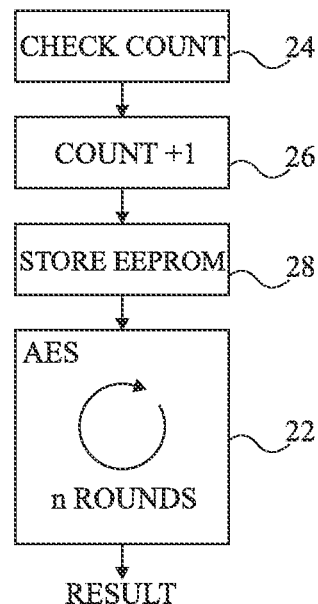
FIG. 2 is a block diagram illustrating a conventional process of update of an AES algorithm execution counter.

FIG. 2 shows, in the form of block diagrams, an example of a conventional process of use of a counter stored in an EEPROM to protect the execution of an AES algorithm. On each execution (block 22, AES) in a plurality of rounds (n ROUNDS) of the algorithm, an operation sequencing program causes the checking of the value of a counter (block 24, CHECK COUNT) to make sure that a threshold in number of executions has not been exceeded. If the process can carry on, the value of counter COUNT is updated (block 26, COUNT+1). Then, this value is stored in the EEPROM (block 28, STORE EEPROM). Once these operations have been performed, the circuit considers that the algorithm can be executed and the output (RESULT) results from this execution.

What use is made of the data manipulated by the algorithm will not be detailed herein, the described embodiments being compatible with current uses of data processed by encryption algorithms.

Figure 3:
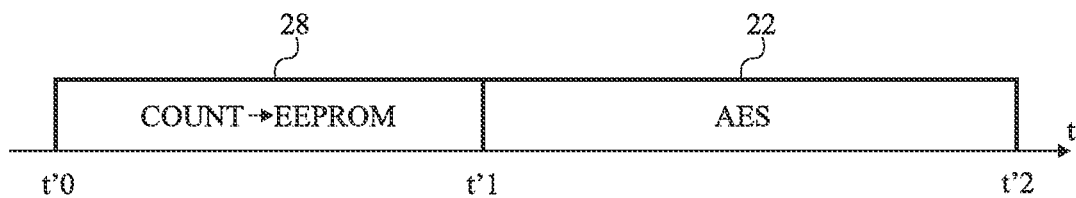
FIG. 3 is a timing diagram illustrating the execution sequence of the process of FIG. 2.

FIG. 3 is a timing diagram illustrating the sequencing of the operations of FIG. 2.

Before a time $t'_0$, counter checking and incrementation steps 24 and 26 are executed, and the values are temporarily stored in the volatile memory. Of course, reading the counter from the EEPROM precedes the checking 24. Between times $t'_0$ and $t'_1$, the updated counter value is written into the EEPROM. Then, between time $t'_1$ (or a slightly subsequent time) and a time $t'_2$, the AES algorithm is executed.

Such a counter update protection mechanism before the execution of the AES algorithm prevents an attacker from interrupting the process just at the end of the calculation of the AES, before the counter has been updated.

However, there remains a risk for an attacker to detect the time of beginning of the execution of the algorithm ($t'_1$) in the process by analyzing the circuit power consumption (simple power analysis (SPA) or differential power analysis (DPA)), which enables him to then concentrate the rest of his analysis on the execution of the AES.

Indeed, a writing into an EEPROM is particularly conspicuous in an electronic circuit power consumption curve, especially due to the additional power required with respect to the normal circuit operation during the write period.

Further, a write operation in an EEPROM is generally relatively long (from one to a few milliseconds), which adversely affects the electronic circuit processing speed.

Figure 4:
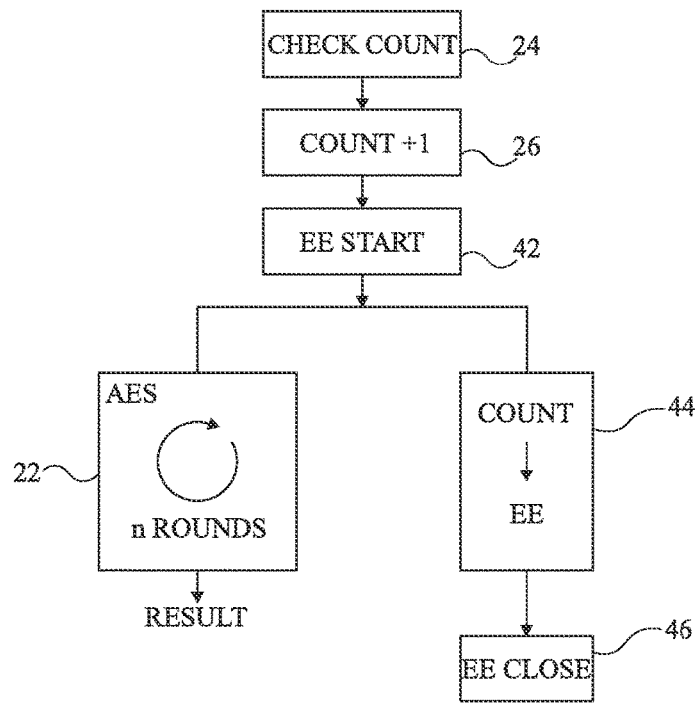
FIG. 4 shows in the form of blocks an embodiment of the method of updating a counter in an EEPROM and of executing an encryption algorithm.

FIG. 4 is a block diagram to be compared with that of FIG. 2, illustrating an embodiment of the method of updating a counter in an EEPROM and of executing an encryption algorithm.

Figure 5:
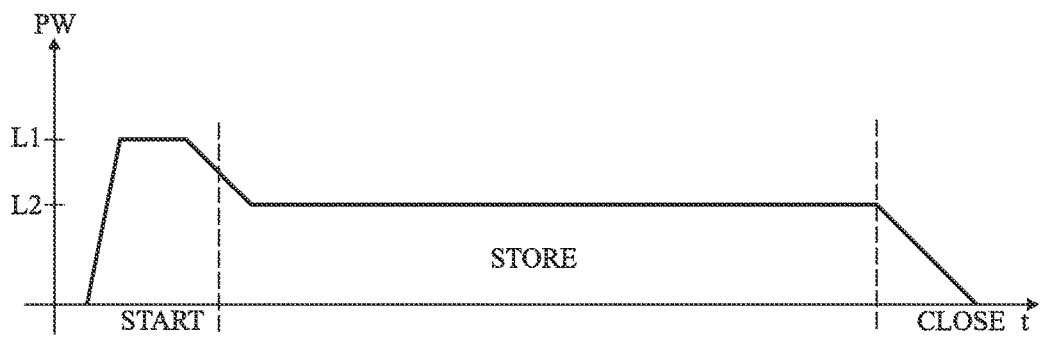
FIG. 5 illustrates the operation of a writing into an EEPROM.

FIG. 5 is a timing diagram very schematically illustrating the power consumed writing into an EEPROM.

Figure 6:
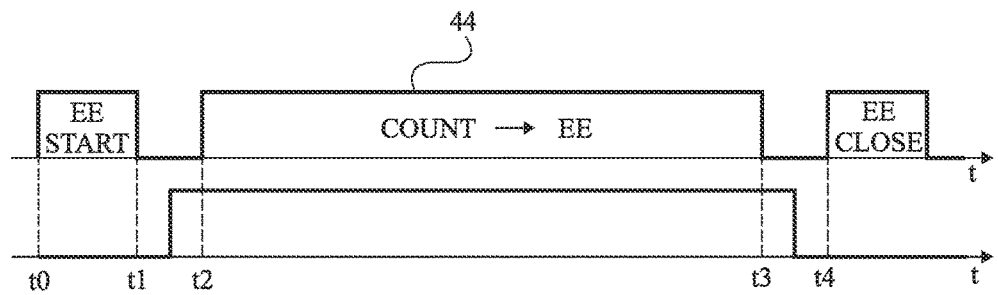
FIG. 6 is a timing diagram illustrating an embodiment of the protection method.

FIG. 6 illustrates, in the form of timing diagrams, the sequencing of the method of FIG. 4.

Each time the algorithm, for example, AES, needs to be executed (block 22), the value of counter COUNT of the number of executions is first checked (block 24, CHECK COUNT). If the new execution is authorized, the counter is updated (block 26, COUNT+1), for example, by being incremented.

Then, the EEPROM is prepared (block 42, EE START) for a write phase.

Writing into an EEPROM can be divided in three phases. As illustrated in FIG. 5, a first phase START comprises activating charge pump circuits to generate a sufficiently high voltage and allow writing into the EEPROMs. During this start phase, the power level consumed by the circuit reaches a first level L1.

Then, when the available power is sufficient, the memory can start being updated for the writing of data. This corresponds to a second phase (STORE) during which the consumed power level decreases to a second level L2.

Once the writing is finished, the charge pump circuits are deactivated or put to rest. This corresponds to a third phase (CLOSE) from which the writing is considered to be finished.

The diagram of FIG. 5 is very simplified and aims at illustrating interpretation made to take advantage of this division in three phases in order to, while still protecting the counter value, enable writing the counter value during the execution of the AES algorithm.

It was recognized that the duration of a writing into the EEPROM (phase STORE) is of the same order of magnitude as the duration of an execution of the AES algorithm.

Further, the processors now present in electronic circuits have a sufficient capacity to execute two operations in parallel, that is, starting the storage into the EEPROM and concurrently executing the algorithm.

Such a parallel execution is illustrated in FIGS. 4 and 6.

Thus, block 42 corresponds to a preparation of the writing but not to a complete write step, which is carried out between times $t_0$ and $t_1$ (FIG. 6). Once the EEPROM is ready to store the value, it is considered that the AES algorithm can start being executed (block 22). Such a starting may be immediate or occur slightly later, as illustrated in FIG. 6. Then, in the example of FIG. 6, at a time $t_2$, subsequent to time $t_1$, the actual writing into the EEPROM, that is, the programming of its cells, is performed (block 44, FIG. 4, COUNT→EE).

The actual writing ends at a time $t_3$ which, in the example of FIG. 6, comes before the end of the execution of the AES algorithm. The EEPROM charge pumps then remain to be deactivated (block 46, EE CLOSE), which is done at a time $t_4$, subsequent to time $t_3$. Preferably, time $t_4$ is also subsequent to the end of the execution of the AES algorithm.

An advantage of the provided sequencing is that the current signature of the writing into the memory, which may lead an attacker to interrupt this writing, will also make him interrupt the execution of the algorithm, and will thus make the output data impossible to exploit.

Another advantage is that this parallel execution generally saves time.

It should be noted that the algorithm may begin as soon as the charge pump circuits (step 42) are active. Similarly, the writing into the EEPROM may occur as soon as this preparation is finished (within times $t_1$ and $t_2$ occurring concurrently). The insertion of a random delay between times $t_1$ and $t_2$ is however preferable to desynchronize the two operations (EEPROM writing and execution of the AES algorithm). Such a protection will create additional difficulties for any attacker desiring to take advantage of the EEPROM writing to align on a specific time of the executed algorithm. Similarly, times $t_3$ and $t_4$ may occur concurrently, in particular if the execution of the AES algorithm is shorter than writing the counter value (block 44).

Various embodiments have been described. Various alterations, modifications, and improvements will readily occur to those skilled in the art. Such embodiments and variations may further be combined. Further, the practical implementation of the described embodiments is within the abilities of those skilled in the art based on the functional indications given hereabove and by using techniques usual per se. In particular, the adaptation of the EEPROM write process as well as the necessary programming of the processing unit to enable this execution is within the abilities of those skilled in the art based on the functional indications. Finally, although reference has been made to an EEPROM, the described embodiments more generally apply to any reprogrammable non-volatile memory having the same type of operation.

Such alterations, modifications, and improvements are intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to protect execution of an encryption algorithm, comprising:
    updating a counter before execution of the encryption algorithm, the counter configured for storage in a reprogrammable non-volatile memory; and
    storing a value of the counter into the reprogrammable non-volatile memory during execution of the encryption algorithm, wherein the storing includes:
        activating a write function of the reprogrammable non-volatile memory;
        writing a value of the counter in the reprogrammable non-volatile memory, the writing of the value corresponding with beginning execution of the encryption algorithm or after execution of the encryption algorithm begins; and
        deactivating the write function of the memory.

2. The method of claim 1 wherein
execution of the encryption algorithm: occurs
between the activating and deactivating.

3. The method of claim 1 wherein the encryption algorithm is an AES algorithm.

4. The method of claim 2, comprising:
    analyzing power consumption of a circuit performing the activating, the writing, the executing, and the deactivating.

5. The method of claim 4 wherein analyzing the circuit power consumption includes executing a simple power analysis (SPA) or executing a differential power analysis (DPA).

6. The method of claim 1, comprising:
    verifying the value is within a threshold before executing the encryption algorithm; and
    prohibiting the act of executing the encryption algorithm if the value is outside of the threshold.

7. An encryption algorithm execution circuit, comprising:
    a reprogrammable non-volatile memory;
    a counting circuit wherein a count value produced by the counting circuit is storable in the reprogrammable non-volatile memory; and
    a processing unit to execute an encryption algorithm, the processing unit configured to enable a write function in the reprogrammable non-volatile memory, concurrently execute the encryption algorithm and store the storable count value in the reprogrammable nonvolatile memory, and disable the write function in the reprogrammable non-volatile memory,
    wherein storing the storable count value in the reprogrammable non-volatile memory corresponds with beginning execution of the encryption algorithm or after execution of the encryption algorithm has begun.

8. The encryption algorithm execution circuit of claim 7 wherein the processing unit is configured to begin storing the count value and begin executing the encryption algorithm at about a same time.

9. The encryption algorithm execution circuit of claim 7 wherein a time between beginning to store the count value and beginning to execute the encryption algorithm is random.

10. The encryption algorithm execution circuit of claim 7 wherein an amount of time to complete storing the count value and an amount of time to execute the encryption algorithm is substantially equal.

11. The encryption algorithm execution circuit of claim 7 wherein the reprogrammable non-volatile memory is an EEPROM.

12. A method, comprising:
    activating charge pump circuits of a reprogrammable non-volatile memory;
    storing a valid count value in the reprogrammable non-volatile memory; and
    concurrent with the storing, executing an encryption algorithm, wherein storing the valid count value in the reprogrammable non-volatile memory corresponds with beginning execution of the encryption algorithm or after execution of the encryption algorithm has begun; and
    deactivating the write function of the memory.

13. The method of claim 12, comprising:
checking a first count value; and
based on the first count value, updating the first count value to produce the valid count value and permitting the activating, the storing, and the executing.

14. The method of claim 13, comprising:
if the first count value is outside a threshold, prohibiting the activating, the storing, and the executing.

15. The method of claim 12, comprising:
deactivating the charge pump circuits of the reprogrammable non-volatile memory.

16. The method of claim 12 wherein the encryption algorithm is an AES algorithm.

17. The method of claim 15 wherein the act of activating the charge pump circuits begins before executing the encryption algorithm and the act of deactivating the charge pump circuits ends after executing the encryption algorithm.

18. The method of claim 12 wherein the act of activating the charge pump circuits begins at a time $t_1$ and the act of executing the encryption algorithm begins at a time $t_2$ and wherein the time between $t_1$ and $t_2$ is a random time less than the time to execute the encryption algorithm.

* * * * *